United States Patent Office 2,960,153
Patented Nov. 15, 1960

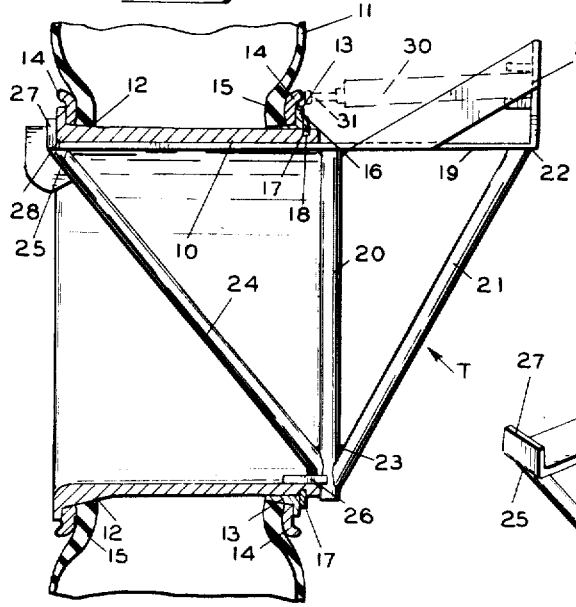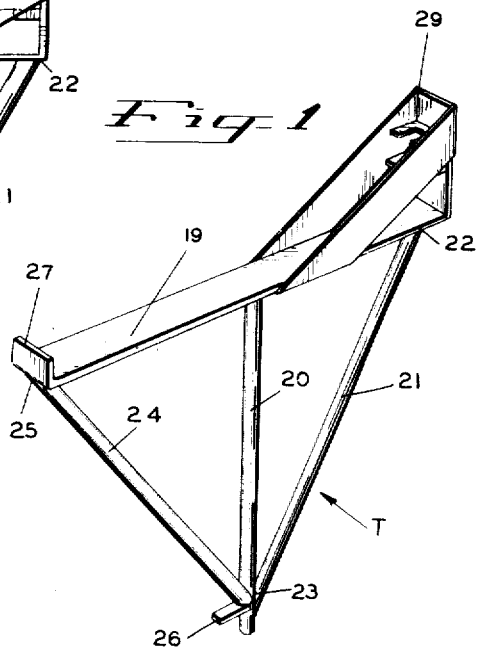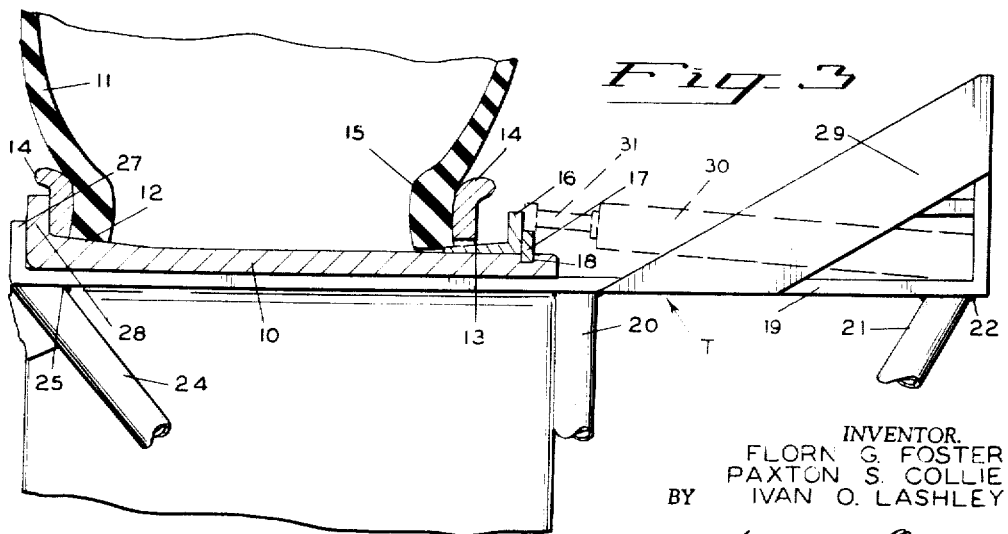

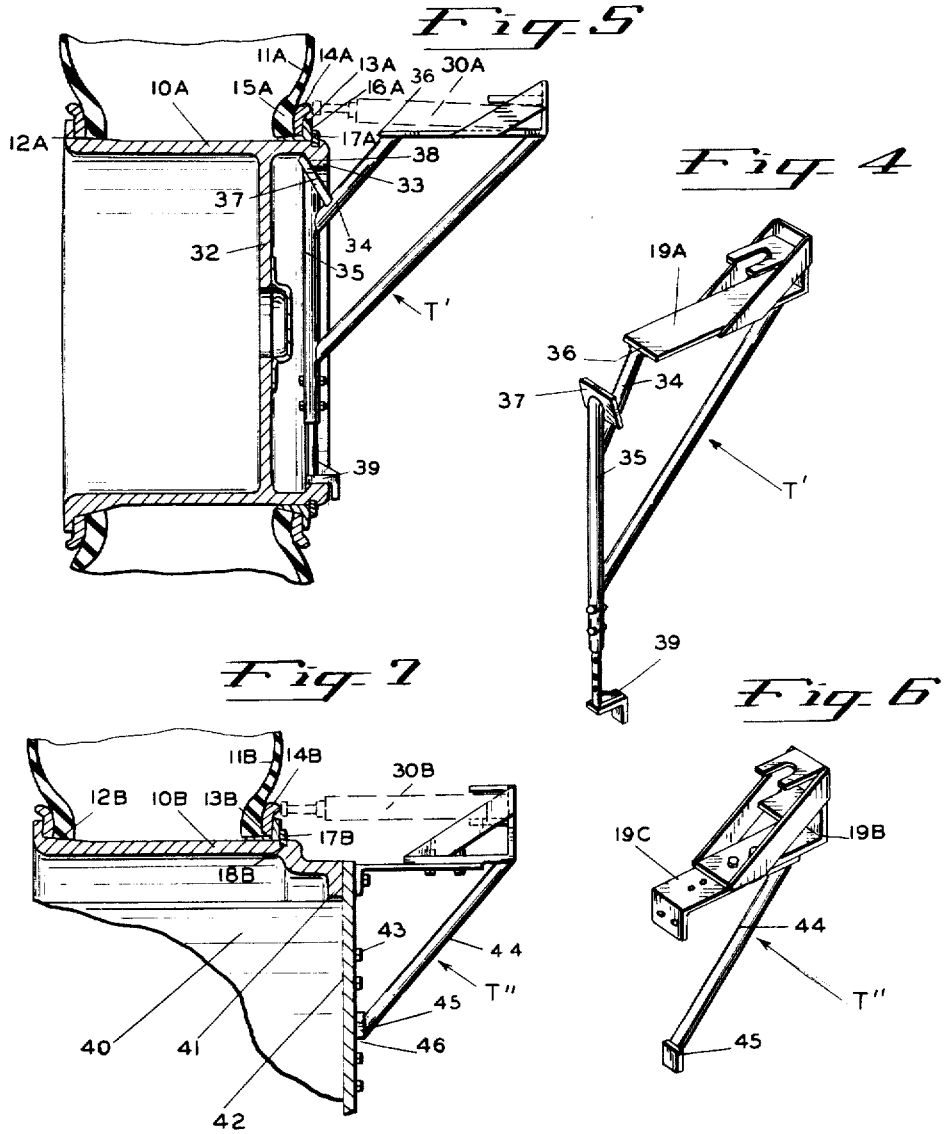

2,960,153

TIRE REMOVING TOOL

Flora G. Foster, Paxton S. Collie, and Ivan O. Lashley, all of General Delivery, Cougar, Wash.

Filed Dec. 10, 1958, Ser. No. 779,317

1 Claim. (Cl. 157—1.26)

The present invention relates to improvements in tire removing tools particularly for use with large tires used on heavy machinery and the like. In these tires the locking band of the tire is very difficult to remove, until the bead flange of the rim and the bead seat ring has been pushed away from the locking band, which requires considerable pressure against the side of the flange and ring, including the bead of the tire, forcing them away from the locking band so that the locking band can be removed from the annular groove of the rim of the wheel.

The primary object of the invention is to provide a tool for supporting a jack in a position to force the flange and bead ring away from the locking band. The tool is of a substantial nature and is securely held to the rim of the wheel to prevent the same from slipping or sliding off of the rim when pressure is applied to the flange, ring and bead of the tire by a jack.

Other objects and advantages will become apparent in the following specification when considered in light of the attached drawings, in which:

Figure 1 is a perspective view of a preferred embodiment of the invention;

Figure 2 is a side elevation of the invention which illustrates the tool applied to the rim of a wheel, with the jack shown in broken lines;

Figure 3 is an enlarged fragmentary side elevation of the invention showing the flange ring and bead of the tire moved inwardly and the bead seat ring about to be moved away from the locking band;

Figure 4 is a perspective view of a modified form of the invention;

Figure 5 is a side elevation of the embodiment of Figure 4 which illustrates the tool on the rim of the wheel with the jack illustrated by broken lines in position to move the flange ring and bead of the tire;

Figure 6 is a perspective view of another modified form of the invention;

Figure 7 is a fragmentary side elevation of the embodiment of Figure 6 which illustrates the tool applied to another type of wheel having a large central hub with the jack shown in broken lines.

Referring now to the drawings in detail wherein like reference characters indicate like parts throughout the several figures, the reference character T indicates generally a tool constructed in accordance with the invention. The tool T is used with a conventional wheel rim 10 illustrated with a tubeless tire 11 mounted thereon. The rims 10 have an inclined bead seat 12 formed on one side and a movable inclined bead seat 13 located on its opposite side. The object of the inclined seats is to tighten the bead of the tire 11 against the rim 10 when air is applied to the tire 11, making an air tight seal therebetween.

With the tires 11 it is very difficult to break the seal to remove the tire 11 from the rim. In addition to the bead seat 13, the usual flange ring 14 nests against the side of the bead 15 of the tire 11. The bead seat 13 has an integral flange 16 forming part thereof, which engages the outer surface of the flange ring 14 and is held thereagainst by a locking band 17.

The locking band 17 is seated in an annular groove 18 formed in the periphery of the rim 10 in the usual manner. In order to be able to remove the locking band 17, the bead of the tire flange 14 and the flange 16 of the bead seat 13 must be moved away from the locking band 17 so that the same can be removed from the groove 18 of the rim 10. This requires considerable pressure and has required considerable time in the past to accomplish the same.

The tool T includes a base frame plate 19, having a vertical leg 20 extending from the center thereof at right angles thereto. The leg 20 is braced by a diagonal brace 21 having one end secured to the end 22 of the frame 19 and its opposite end to the lower end of the vertical leg 20 at 23, by suitable means such as welding.

A second diagonal brace 24 has one end fixedly secured to the end 25 of the base frame 19 and the opposite end to the lower end of the leg 20 oppositely of the brace 21. A foot 26 is formed at right angles to the leg 20 and is secured thereto below the connection of the leg 20 with the braces 21 and 24. An upwardly extending hook 27 is formed on the end 25 of the base plate 19.

A jack receiving pocket 29 is formed on the end 22 of the base plate 19 and supports a jack, as indicated by the broken lines 30.

Referring to Figure 2 particularly, the piston 31 of the jack 30 is shown engaging the outer surface of the flange 14 to force the flange 14 and bead 15 of the tire 11 to the position shown in Figure 3. In Figure 3 the piston 31 of the jack 30 is shown engaging the flange 16 of the bead seat 13 to move it away from the locking bead 17 so that the bead 17 can be removed from the groove 18 of the rim 10.

In performing this operation, it is very desirable that the tool T be rigidly held so that under pressure it will not slip, possibly injuring the operator, therefore the foot 26 on the stabilizing leg 20 engages the rim 10 to hold the tool T centrally of the rim 10 with the hook 27 engaging the edge of the rim 10 opposite the locking band 17 mounting the tool T so that the same cannot move.

Referring to Figures 4 and 5, a modified tool T is used with wheels of the type having a rim 10A supported on a disk 32. In this type of wheel a radially inwardly extending bead 33 is formed on the inner side of the rim 10A, therefore in this design the base plate 19A is shorter than the base plate 19 of the preferred form of the invention and does not extend to the opposite side of the rim 10A being blocked by the disk 32. An offset member 34 slopes upwardly and outwardly from the upper end portion of the leg 35 and is connected to the end 36 of the base plate 19A for embracing the internal bead 33 of the rim.

The upper end of the leg 35 has a downwardly and outwardly sloping foot 37 secured thereto to engage the inner surface 38 of the internal bead 33, as best illustrated in Figure 5. The leg 35 has a foot 39 adjustably secured to its opposite end to engage the oppositely disposed side of the internal periphery of the bead 33, thus supporting the tool T' rigidly in place while tire removing pressure is applied, as above described. The tool T' is adapted to support a jack 30A in the same manner as the jack 30 is supported by the tool T.

Referring to Figures 6 and 7, another modified tool T" is illustrated. With many wheels an extra large hub 40 is used with the rim 10B having a flange 41 which is bolted to the outer end 42 of the hub 40 by bolts 43. The tool T" is adapted to be bolted to the flange 41 of the rim 10B by bolts 43, as best illustrated in Figure 7, The bolts 43 take up the pulling stress of the tool T″ when a jack 30B is being used.

In this particular tool T″ a diagonal bracing leg 44 is secured to and extends downwardly and inwardly from the base plate 19B, terminating in a foot portion 45 which is adapted to rest against the central portion 46 of the hub 40, bracing the tool T″ when the pressure is applied thereto.

The base plate 19B has an extensible bracket 19C secured thereto adapting the tool T″ to use with many hubs of varying characteristics.

Having thus described the preferred embodiment of the invention, it should be understood that numerous structural modifications and adaptations may be resorted to without departing from the scope of the appended claim.

What is claimed is:

A tool for supporting a jack in position to remove a tire from a wheel rim comprising a base plate, a jack support integrally mounted on one end of said base plate, a leg extending in perpendicular relation to said base plate, a first offset member connecting the end of the base plate opposite said jack support with a point adjacent the upper end of said leg in spaced offset relation thereto, a downwardly and outwardly sloping foot on said upper end of said leg adapted to engage the inner side of a wheel rim flange, a second angularly offset reinforcing member connecting the end of said base plate carrying said jack support with the lower end of said leg, and a second wheel rim flange engaging foot on the lower end of said leg.

References Cited in the file of this patent

UNITED STATES PATENTS

| | | |
|---|---|---|
| 2,568,874 | Vanleirsberghe | Sept. 25, 1951 |
| 2,575,330 | Carlson | Nov. 20, 1951 |
| 2,678,089 | Grant | May 11, 1954 |
| 2,679,896 | Branick | June 1, 1954 |
| 2,775,289 | Anderson | Dec. 25, 1956 |